(12) United States Patent
Brunier

(10) Patent No.: US 7,095,138 B1
(45) Date of Patent: Aug. 22, 2006

(54) CONTROLLER FOR PLURAL SUPPLIES DRIVING SINGLE LOAD

(76) Inventor: Jacques Brunier, 3219 S. Andrews Ave., Fort Lauderdale, FL (US) 33316

( * ) Notice: Subject to any disclaimer, the term of this patent is extended or adjusted under 35 U.S.C. 154(b) by 403 days.

(21) Appl. No.: 10/267,456

(22) Filed: Oct. 9, 2002

Related U.S. Application Data

(60) Provisional application No. 60/329,328, filed on Oct. 16, 2001.

(51) Int. Cl.
*H02J 3/04* (2006.01)
*H02J 3/00* (2006.01)
*H02H 3/26* (2006.01)
*H02H 3/32* (2006.01)

(52) U.S. Cl. .................... 307/43; 307/18; 307/25; 307/29; 307/53; 307/80; 307/81; 307/127; 361/85

(58) Field of Classification Search ............... 307/43, 307/127, 18, 25, 29, 53, 80, 81; 361/76, 361/77, 85; 363/69, 71; 323/213, 272
See application file for complete search history.

(56) References Cited

U.S. PATENT DOCUMENTS 3,976,919 A * 8/1976 Vandevier et al. ............ 361/96
5,355,296 A * 10/1994 Kuo et al. ................. 363/43
6,151,231 A * 11/2000 Saint-Pierre et al. ........ 363/95

* cited by examiner

*Primary Examiner*—Brian Sircus
*Assistant Examiner*—Hal I. Kaplan
(74) *Attorney, Agent, or Firm*—Daniel S. Polley, P.A.

(57) ABSTRACT

A controller is disclosed for determining that the currents from the two AC power sources are correctly phased. Required circuitry can be disposed within a housing from which extend power cables having single phase 240V AC, 50 A male connector plugs connected at remote ends. Prongs in each of plugs can be arranged so that the plugs are connectable to a 240V, single phase AC source. A power cable, having a connector at a remote end, can also extend from the housing. The power cable connector can be connected to an AC power supply. The power cable connector supply a power transformer with single phase AC power at 240V and 100 A. The circuitry can assure that the phases and voltages of the two AC sources driving the connectors are properly connected to the connectors to enable the cable to supply the power cable connector with single phase AC.

24 Claims, 3 Drawing Sheets

US 7,095,138 B1

CONTROLLER FOR PLURAL SUPPLIES DRIVING SINGLE LOAD

This Application claims priority to and the benefit of U.S. Application No. 60/329,328, filed Oct. 16, 2001, which is incorporated by reference.

FIELD OF THE INVENTION

The present invention relates generally to controllers for safely combining and summing currents from two AC power sources and, more particularly, to a controller including solid-state circuitry for determining that the currents from the two AC power sources are correctly phased.

BACKGROUND ART

It is desirable for certain applications to combine the AC current from two AC single phase power sources having about the same voltage to drive an AC load. In particular, many pleasure boats have single phase AC load requirements of about 240 volts and 100 amperes. Typically, marinas where such pleasure boats land have single phase AC power sources cable of delivering 240 volts and only 50 amperes. A prior art system enables such boats to be powered by marinas having AC power sources which are combined to satisfy the boat power requirements. The AC commercial system includes a controller employing a considerable number of relays which frequently do not respond in sufficient time to provide safe and proper operation of the pleasure boat electrical system and is often out of service due to moisture in the relays and in the connections between the relays.

SUMMARY OF THE INVENTION

The present invention preferably provides a controller, which can include solid-state circuitry, for determining that the currents from the two AC power sources are phased correctly. The circuitry of the controller can be disposed within a housing from which extend power cables, preferably having single phase 240 Volts AC, 50 Ampere male connector plugs connected to them at the ends of the cables remote from the housing. The cables can include a neutral wire and two "hot" lines connected to separate prongs in the plugs. The prongs in each of the plugs can be arranged so that the plugs are connectable to preferably a 240 volt, single phase AC source, having a neutral line or terminal. A power cable can also extend from the housing and can have, at its end remote from the housing, a connector which is connected to an AC power supply. The connector and cable can be arranged to supply a power transformer with single phase AC power preferably at 240 volts and 100 amperes.

The circuitry in the housing can be arranged to supply the cable with single phase AC power at 240 volts and 100 Amperes only if the connectors are properly connected to the female outlets. Thus, the circuitry assures that the two AC sources driving the connectors are properly connected to enable the cable to supply the power cable connector with single phase AC power preferably at 240 volts and 100 amperes.

The circuitry within the housing can include several integrated circuits and a bipolar transistor, all of which require DC power supply voltages (AC to DC converter Circuitry or Transformer/Regulator circuitry). Relays coils and contact switches can also be included.

Certain of the integrated circuits can include an electro-optical coupling arrangement to provide voltage isolation between their signal input and output terminals.

The integrated circuits, in conjunction with the relay coils and a triac driving circuit, provide control to open and close the contacts, so that the contacts are closed if AC Voltages having the correct amplitude and phase are present, and open if the correct voltages are not present. Where the contacts are closed, currents flowing through two of the contacts contact are summed at a first summing terminal and currents flowing through two other contacts are summed at a second summing terminal and both are supplied to the power cable connector.

DETAILED DESCRIPTION OF THE DRAWINGS

Figure 1:
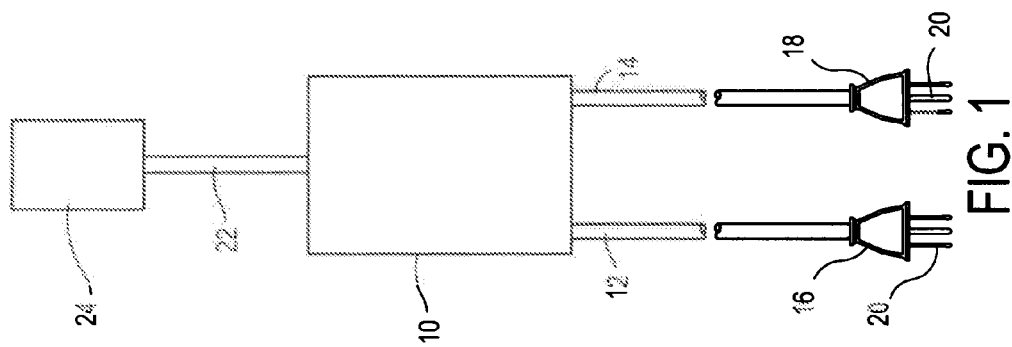
FIG. 1 is a diagram of a housing including the circuitry of the present invention in combination with cords connected to plugs for connection to outlets at marina docks and a cord connected to a plug for connection to power supply terminals of a pleasure boat.

Reference is now made to FIG. 1 of the drawing which includes housing 10 from which extend power cables 12 and 14, respectively having single phase 240 volts AC, 50 ampere male connector plugs 16 and 18 connected to them at the ends of the cables remote from housing 10. It should be recognized that other ampere and/or volt values can be used and are all considered within the scope of the invention.

Each of cables 12 and 14 includes a neutral wire and two "hot" lines connected to separate prongs 20 in plugs 16 and 18. Prongs 20 in each of plugs 16 and 18 are arranged so that the plugs are connectable to 240 volt, single phase AC sources having a neutral line or terminal, as supplied by female outlets on poles at marinas where pleasure boats dock. It is also within the scope of the invention that the location of the female and males outlets are reversed (i.e. male outlets on poles at marinas). It should also be recognized that the invention is not limited to outlets at marinas and the other outlet locations are also considered within the scope of the invention (i.e. the invention could also be installed in the boat and two 50 Amps cords run to the dock). However, for purposes of the discussion of the invention a marina outlet will be used.

Power cable 22 also extends from housing 10 and has, at its end remote from housing 10, connector 24, which is connected to the AC power supply of the pleasure boat. Connector 24 and cable 22 are arranged to supply a power transformer of the pleasure boat or other location with single phase AC Power at 240 volts and 100 amperes. Circuitry in housing 10 is arranged to supply cable 22 with single phase AC power at 240 volts and 100 amperes (or other desired value) only if connectors 16 and 18 are properly connected to the female outlets at the marina where the pleasure boat is docked. In particular, the circuitry assures that the two AC sources driving connectors 16 and 18 are properly connected to the connectors to enable cable 22 to supply connector 24 with single phase AC at 240 volts and 100 amperes. Plug 16 includes internal terminals 26, 28, and 30 (FIG. 2) connected to prongs 20. Terminals 26, 28 and 30 are respectively connected, in operation, to a neutral terminal (N), a first Phase (phase 1) and a second phase (phase 2) of a first female outlet at the marina. At any instant of time, the voltage at phase 1 is displaced by 180 degrees from the voltage at phase 2; the voltage at each phase differs from the neutral by about 120 volts RMS. Similarly, plug 18 includes internal terminals 32, 34 and 36 connected to prongs 20. Terminals 32, 34 and 36 are respectively connected, in operation, to a neutral terminal (N'), a first phase (phase 1') and a second phase (phase 2') of a second female outlet at the marina. Terminals 26, 28 and 30 and terminals 32, 34 and 36 are connected to separate leads in cables 12 and 14 respectively. The lines in cables 12 and 14 connected to neutral terminals 26 and 32 of plugs 16 and 18 are respectively connected to phase 1 and phase 2 terminals 56 and 58 in housing 10, while the lines in cable 14 connect to terminals 34 and 36 are respectively connected to phase 1' and 2' terminals 60 and 62 in housing 10.

Neutral terminals 52 and 54 are connected directly to circuitry within the remainder of housing 10. Terminals 56, 58, 60 and 62 are connected directly to semiconductor circuitry within the remainder of the housing 10. Terminals 56, 58, 60 and 62 are selectively connected to cable 22 by way of normally open relay contacts 40, 38, 42 and 44, respectively. Contacts 38 and 40 are double pole contacts controlled by relay coil 41, while contacts 42 and 44 are double pole contacts controlled by relay coil 46. Zener diodes 48 and 50, respectively connected in shunt with coils 41 and 46, maintain a constant voltage across the coils for transient suppression. To ensure proper and simultaneous closing of all contacts 38, 40, 42, and 44, coil 41, which controls closure of phase 1 and phase 2 contacts 38 and 40, is connected to N' neutral terminal 54, while coil 46, which controls closure of phase 1' and phase 2' contacts 42 and 44, is connected to N' neutral terminal 52. The circuitry in housing 10 causes closure of contacts 38, 40, 42, and 44 by supplying coils 41 and 46 with AC current in parallel when detection circuitry in housing 10 determines that the correct phase conditions exist at terminals 56, 58, 60 and 62.

The normally open terminals 37 and 39 of contacts 38 and 40 are respectively connected to terminals 58 and 56 in housing. 10, while the normally open terminals 43 and 45 of Contacts 42 and 44 respectively connected to terminals 60 and 62 in housing 10. When contacts 38, 40, 42 and 44 are closed, contacts 38 and 44 are both connected to terminal 64 and contacts 40 and 42 are both connected to terminal 66. Hence, the phase 2 and phase 2' currents flowing through contacts 38 and 44 are summed at terminal 64 while the phase 1 and phase 1' currents flowing through contacts 40 and 42 are summed at terminal 66. The AC voltage between terminals 64 and 66 is the same as the AC voltage across the phase 1 and phase 2 terminals 56 and 58, which is also about the same as the AC voltage across the phase 1' and phase 2' terminals 60 and 62. The currents flowing through terminals 56 and 60 and flowing through terminals 58 and 62 are summed without the need for an expensive, relatively voluminous and heavy transformer. The currents can be summed at terminals 64 and 66, without the need for a transformer, because the remaining circuitry in housing 10 closed contacts 38, 40, 42 and 44 only in response to the AC voltage across terminals 56 and 58 having virtually the same phase and virtually the same magnitude as the voltage across terminals 60 and 62. The voltage between terminals 64 and 66 and the currents summed at these terminals are supplied to cable 22, which is connected to connector 24 and the power transformer of the pleasure boat or other location.

The circuitry in housing 10 includes integrated circuits 70, 72, 74, 76, 78, 80, and bipolar transistor 82, all of which require DC power supply voltages. To these ends, housing 10 includes AC to DC converter 84 having one input terminal connected to phase 1' terminal 60 and a second input terminal connected to the AC voltage at terminal 58. Converter 84 includes conventional rectifying and regulating circuitry for deriving a +5 V DC power supply voltage on terminal 86 (other voltages can also be used and are considered within the scope of the invention. The positive DC voltage on terminal 86 is supplied to power supply terminals of each of integrated circuits 70,72,74,76,78 and 80 and to the emitter of PNP bipolar transistor 82.

Each of integrated circuits 70,72,74,76 and 80 includes an electro-optical coupling arrangement between its signal input and output terminals to provide voltage isolation between its signal input and output terminals. Integrated circuits 70 and 74 can be of identical type, and integrated circuit 72 and 76 can be of identical type which differs from integrated circuits 70 and 74.

Integrated circuits 70 and 74 include signal input terminals 1 and 4 and signal output terminal 6, as well as power supply terminals 5 and 8, respectively connected to Neutral terminal 53 and terminal 86 of AC to DC converter 84. Signal output terminals 6 of integrated circuits 70 and 74 are connected through load resistors 87 to DC power supply terminal 86. Terminal 1 of integrated circuit 70 is connected to phase 2 input terminal 58 by current limiting and voltage dropping resistors 88 while terminal 4 of integrated circuit 70 is connected directly to phase 1 input terminal 56. Terminal 1 of integrated circuit 74 is connected to phase 1' input terminal 60 by current limiting and voltage dropping resistors 90, while terminal 4 of integrated circuit 74 is connected directly to phase 2' input terminal 62. Each of integrated circuits 70 and 74 supplies its output terminal 6 with a high, binary one level in response to the voltage between its input terminals 1 and 4 exceeding a predetermined value that occurs during each half cycle of the AC voltage between terminals 56 and 58 or between terminals 60 and 62; for example, if the rated voltage between terminals 56 and 58 is 240 volts AC, RMS, circuit 70 supplies its output terminal 6 with a binary one level in response to the instantaneous voltage at terminal 58 exceeding the voltage at terminal 56 by 240 volts and in response to the instantaneous voltage at the terminal 5 exceeding the voltage at terminal 58 by 240 volts. If the amplitude and phase of the voltage between terminals 60 and 62 are about the same as the amplitude and phase of the voltage between terminals 56 and 58, integrated circuit 74 supplies its output terminal 6 with binary one levels at about the same time circuit 70 supplies its output terminal 6 with binary one levels. Each of integrated circuits 72 and 76 includes signal input terminals 1 and 2 and signal output terminal 3, connected by load resistors 87 to power supply terminal 86.

Each of integrated circuits 72 and 76 also includes output terminal 4, connected to neutral terminal 52. Input terminal 1 of integrated circuit 72 is connected by current limiting and voltage dropping resistors 92 to phase 1 terminal 56 while input terminal 2 of integrated circuit 72, is connected directly to phase 1' input terminal 60. Input terminal 1 of integrated circuit 76 is connected by current limiting and voltage dropping resistors 94 to phase 2' input terminal 62, while terminal 2 of integrated circuit 76 is connected directly to phase 2 input terminal 58. Each of integrated circuits 72 and 76 supplies its output terminal 3 with a low, binary zero level in response to the voltage between its input terminals 1 and 2 being approximately 0 V AC, that is, an AC voltage in the range of 0–1 V, as occurs when AC voltages of the correct amplitude and phase drive are connected to terminals 56, 58, 60 and 62.

When plugs 16 and 18 are correctly connected to AC sources at the marina, integrated circuits 70 and 74 substantially simultaneously derive binary one levels during a high amplitude portion of each half cycle of the AC sources, while integrated circuits 72 and 76 always derive binary zero levels. Integrated circuit 78 senses the binary levels at output terminals 6 of integrated circuits 70 and 74 and the binary levels at the output terminals 3 of integrated circuits 72 and 76 to determine if plugs 16 and 18 are correctly connected to AC sources. To these ends, integrated circuit 78 is a programmable integrated circuit, having a flow diagram described in connection with FIG. 3. Integrated circuit 78 includes input terminals 2, 3, 6 and 7 respectively connected to output terminal 3 of integrated circuit 72, output terminal 6 of integrated circuit 74, output terminal 3 of integrated circuit 76 and output terminal 6 of integrated circuit 70. Integrated circuit 78 also includes power supply terminals 1 and 8, respectively connected to DC power supply terminal 86 and neutral terminal 52.

Integrated circuit 78 provides control to open and close contacts 38, 40, 42 and 44 so the contacts are closed if AC voltages having the correct amplitude and phase are at terminals 56, 58, 60 and 62, and open if the correct voltages are not at these terminals. To these ends, circuit 78 senses the binary levels at the output terminals 6 of integrated circuits 70 and 74 and the output terminals 3 of integrated circuit 72 and 76.

Integrated circuit 78 also includes input terminal 4, connected to the collector of transistor 82. Transistor 82 includes an emitter connected directly to DC power supply terminal 86. Transistor 82 also includes a base connected by resistor 98 to tap 100, between resistor 102 and zener diode 104. Resistor 102 and zener diode 104 are connected in series between DC power supply terminal 86 and neutral terminal 52. The collector of transistor 82 is connected by load resistor 105 to neutral terminal 52.

Transistor 82 and the circuitry associated with it are such that during normal operation when the correct voltages are applied to the terminals of plugs 16 and 18, the transistor is conducting and a low impedance is provided between its emitter and collector electrodes. Consequently, the power supply voltage at terminal 86 is supplied to input terminal 4 of integrated circuit 78. If, however, some disturbance occurs in the circuitry, the voltage at the base of transistor 82 drops, to cut off the emitter collector path of transistor 82 and cause the low, neutral voltage at terminal 52 to be coupled to input terminal 4 of integrated circuit 78. In response to the voltage at input terminal 4 of integrated circuit 78 being at the low neutral voltage of terminal 52, integrated circuit 78 is reset to cut off the supply of current to coils 41 and 46 to open contacts 38, 40, 42 and 44. Integrated circuit 78 is programmed to detect the binary output levels of integrated circuits 70, 72, 74 and 76 to determine if (1) binary zero to one transitions at the outputs of circuits 70 and 74 occur within a predetermined time interval (the predetermined time interval is a few percent of each 8.33 millisecond half cycle of each 60 Hz input cycle), (2) binary one to zero transitions occur within this interval, and (3) circuits 72 and 76 always drive binary zero outputs. In response to these three conditions being satisfied, circuit 78 causes contacts 38–42 to close, provided transistor 82 is conducting, to couple a high voltage to terminal 4 of circuit 78. Integrated circuit 78 is programmed to respond instantaneously to a decrease in the voltage at its input terminal 4.

Integrated circuit 78 includes output terminal 5, connected to input terminal 1 of integrated circuit 80 by resistor 106. Integrated circuit 80 also includes input terminal 2, connected to neutral terminal 52, as well as output terminals 4 and 6. Integrated circuit 80 supplies terminal 4 with a high voltage relative to the voltage at terminal 6 in response to integrated circuit 78 supplying its output terminal 5 with a high, binary one level, indicative of proper connection of plugs 16 and 18 to the AC sources driving them.

The output voltage of integrated circuit 80, between terminals 4 and 6 thereof, is supplied to conventional Triac driving circuitry, which in turn drives gate electrode 108 and anode 110 of triac 112, having an anode cathode path between phase 2 terminal 58 and terminal 114. Terminal 114 is connected in parallel to one side of each Of coils 41 and 46 and zener diodes 48 and 50. Triac 112 is activated into a conducting state, to provide a low impedance path between phase 2 terminal 58 and terminal 114, to supply current to coils 41 and 46, in response to integrated circuit 78 sensing proper connections of plugs 16 and 18 to the AC sources driving them. In response to current flowing through coils 41 and 36, contacts 38, 40, 42 and 44 close, causing the AC currents flowing through plugs 16 and 18 to be summed and supplied to cable 22 and connector 24.

Figure 3:
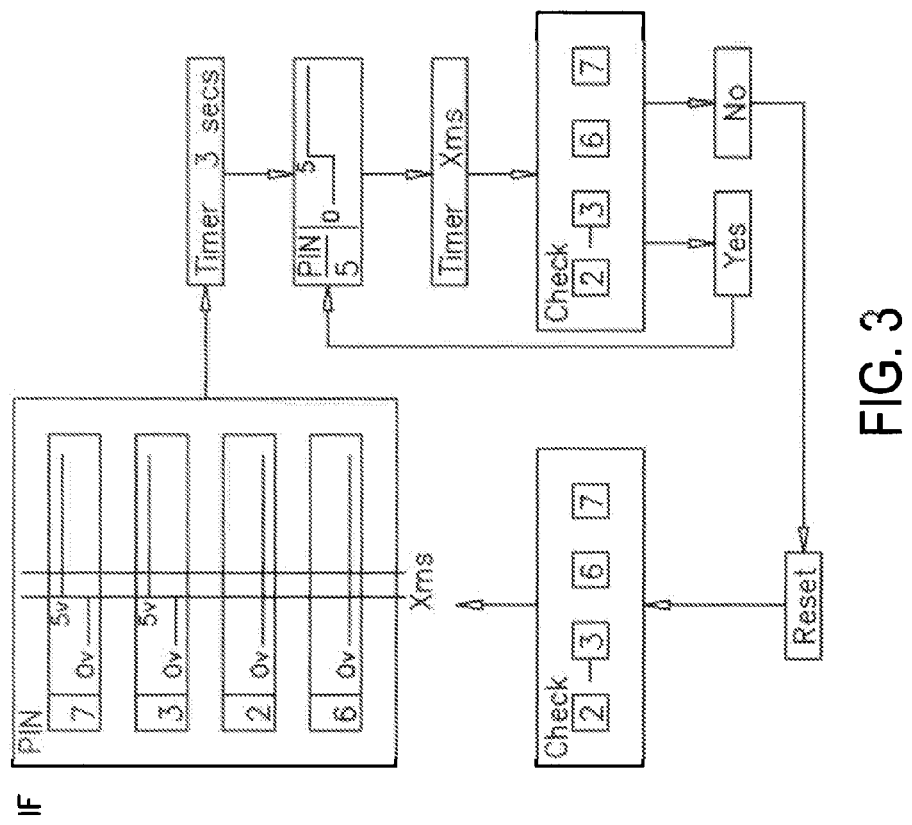
FIG. 3 is a flow diagram of operations performed by a microprocessor included in the electronic circuitry of FIG. 2.

FIG. 3 is a flow diagram of the operations that occur during each periodic detection cycle of the voltages of terminals 2, 3, 6 and 7 of Integrated Circuit 78. Each periodic detection cycle has a duration that is a small fraction of each 60 Hz half cycle. Integrated circuit 78 periodically detects the voltages at its input terminals 2,3,6 and 7. Integrated circuit 78 includes a timer that is activated during each periodic detection cycle in response to (1) positive going transitions occurring in the binary levels at terminals 3 and 7 within a predetermined interval of each other, or (2) negative going transitions occurring within this interval (as previously described), and (3) no transitions occurring at terminals 2 and 6 during this interval. The timer causes integrated circuit 78 to supply its output terminal 5 with a binary zero to one transition a few seconds after the correct voltage condition existed at input terminals 2,3,6 and 7 of integrated circuit 78. The timer maintains the binary one level at terminal 5 for the interval between adjacent binary one levels at output terminals 6 of circuits 70 and 74, i.e., while circuits 70 and 74 derive binary zero levels during each 60 Hz half cycle, when the voltages at the input terminals of circuits 70 and 74 are less than the difference in voltage which causes circuits 70 and 74 to derive binary one levels. If the voltages at terminals 56, 58, 60 and 62 have the incorrect amplitude or phase, (1) the binary transitions at signal output terminals 6 of circuits 70 and 74 do not occur within the predetermined interval and/or (2) one or both of circuits 72 and 76 derives a binary one output. When integrated circuit 78 senses any one of these occurrences it activates the timer to immediately cause terminal 5 of circuit 78 to have a binary zero value. The binary one and zero levels at terminal 5 of integrated circuit 78 cause contacts 38, 40, 42 and 44 to be closed and opened respectively.

While integrated circuit 78 is activated to cause its output terminal 5 to derive a binary one level, another timer in integrated circuit 78 is activated during the next half cycle of the AC at plugs 16 and 18 to determine if the correct voltages are still being applied to input terminals 2, 3, 6, and 7 of the integrated circuit. In response to the determination indicating that the correct voltages are still being applied to input terminals 2, 3, 6,'7 of integrated circuit 78, the integrated circuit causes the binary one level to remain at its output terminal 5.

In response to integrated circuit 78 determining that the correct voltages are no longer being applied to its input terminals 2,3,6 and 7, integrated circuit 78 causes the voltage at its output terminal 5 to have a binary one to zero transition, causing circuit 80 to deactivate triac 112. In response to triac 112 being deactivated current stops flowing through coils 41 and 46, resulting in open circuiting of contacts 38, 40, 42 and 44 and removal of power from cable 22 and connector 24. Similar operation occurs in response to the emitter collector path of transistor 82 having a high impedance as a result of an undesirable transient being detected at terminal 100.

Integrated circuit 78, after being reset as a result of the correct voltages no longer being applied to its input terminals 2,3,6 and 7 or in response to a change of condition of transistor 82, again periodically checks the voltages at its input terminals 2,3,6 and 7. In response to the voltages at its input terminals 2,3,6 and 7 having the correct values, integrated circuit 78 again activates integrated circuit 80 to cause triac 112 to be activated into a conducting state.

Figure 2:
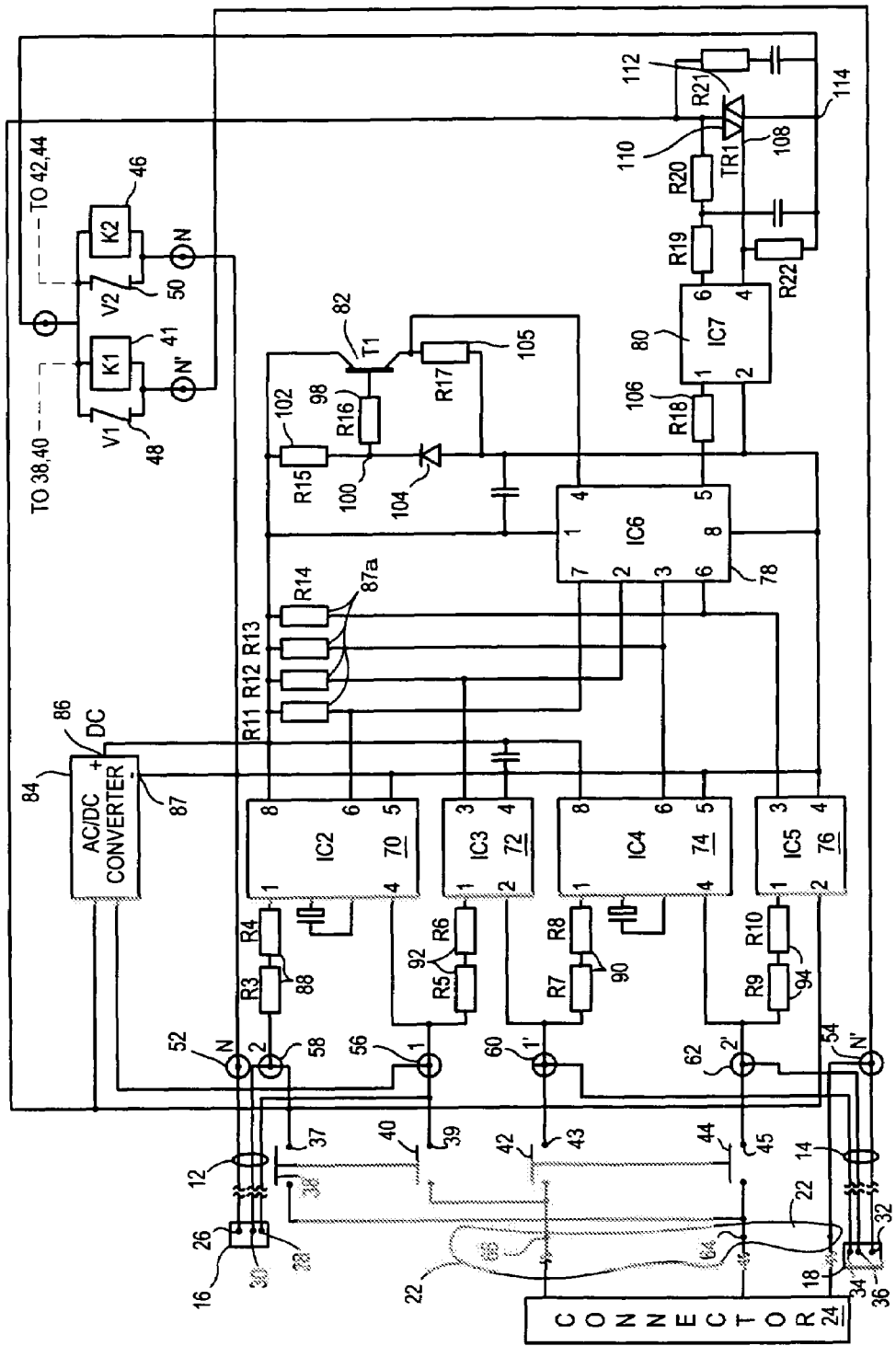
FIG. 2 is a block and schematic circuit diagram of electronic circuitry in the housing of FIG. 1 in accordance with a preferred embodiment of the present invention.
Figure 4:
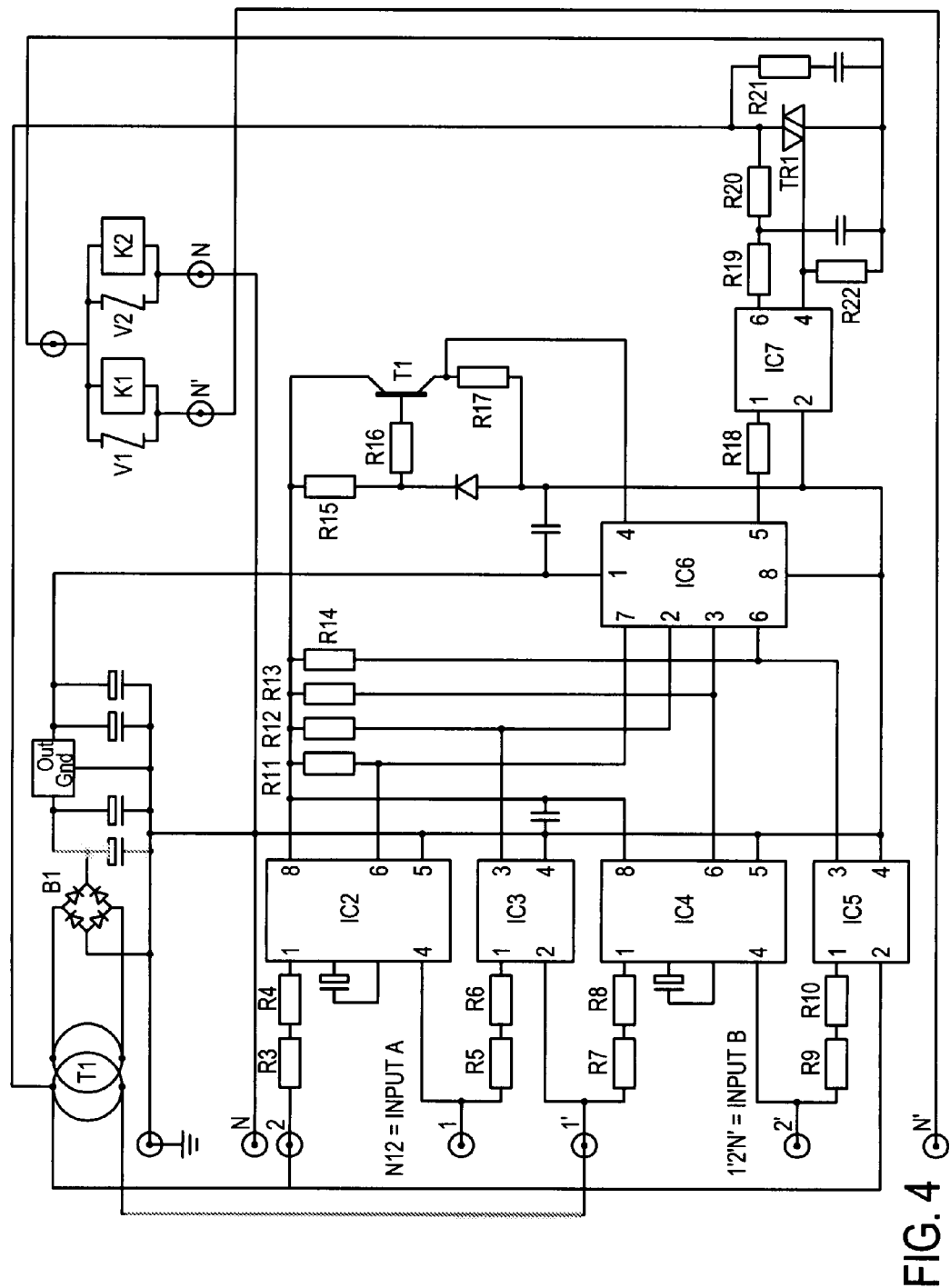
FIG. 4 is a block and schematic circuit diagram of electronic circuitry in the housing of FIG. 1 in accordance with an alternative embodiment of the present invention.

FIG. 4 operates similar to the schematic of FIG. 2 and merely substitutes a transformer/regulator circuitry for the power supply in place of the AC/DC converter circuitry power supply. Though not shown, the schematic of FIG. 4 also includes connectors 16, 18 and 24, contacts 38, 40, 42, and 44 and other shown components in FIG. 2.

Though not limiting, some of the values for certain components in the circuitry can include: R1—150 Ohm 2 W TS 350V; R2—2.7Ω½ W; R3—75K ½ W 350V; R4—75K ½ W TS 350V; R5—150K ½ W TS 350V; R6—150K ½ W TS 350V; R7—75K ½ W TS 350V; R8—75K ½ W TS 350V; R9—150K ½ W TS 350V; R10—150K ½ W TS 350V; R11—22K SIL; R12—22K SIL; R13—22K SIL; R14—22K SIL; R15—33K ¼ W; R16—10K ¼ W; R17—39K ¼ W; R18—680 Ohm ¼ W; R19—220 Ohm ½ W 350V; R20—220 ¼ W 350V; R21—39 Ohm ½ W; R22—120 Ohm ½ W; R23—75K Ohm ¼ W; R24—150 K Ohm ¼ W; C1—100 N×2 250V alt.; C2—100 micro F 25V; C3—100 pf; C4—10 Ohm F 35V Tantalium; C5—10 Ohm F 35V Tantalium; C6—10 Ohm F 35V Tantalium; C7—100 N 63V; C8—100 N 63V; C9—100N ×2 250V alt.; C10—10N ×2 250V alt.; IC1—HV 2405 E9; IC2—HPCL 3760; IC3—HII AAI; IC4—HPCL 3760; IC5—HII AAI; IC6—PIC 508 or 509; IC7—MOC 3043; T1—BC 557 B; TR1—LLC 226 B; Z1—3.9V 400 MW; V1—VDR; V2—VDR; TRANSIL 1.5K E 300; K1,K2 relay coils. It should be recognized that other values can be used and are also within the scope of the invention.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A controller for combining and summing two AC power sources, comprising:
    a first connector having a first phase terminal and a second phase terminal, said first connector adapted for communication with a first externally located incoming AC power source;
    a second connector having a first phase terminal and a second phase terminal, said second connector adapted for communication with a second externally located incoming AC power source, said second incoming AC power source independent of said first incoming AC power source;
    a first contact having a terminal, said first contact terminal in communication with the second phase terminal of said first connector;
    a second contact having a terminal, said second contact terminal in communication with the first phase terminal of said first connector;
    a third contact having a terminal, said third contact terminal in communication with the first phase terminal of said second connector;
    a fourth contact having a terminal, said fourth contact terminal in communication with the second phase terminal of said second connector; and
    means for comparing a phase and amplitude of said first externally located incoming AC power source with a phase and amplitude of said second externally located incoming AC power source without any conversion of said first externally located incoming AC power source or said second externally located incoming AC power source;
    means for opening and closing said first contact, said second contact, said third contact and said fourth contact based on information received from said means for comparing;
    wherein said first contact, said second contact, said third contact and said fourth contact are closed when the phase and amplitude of said first incoming AC power source is the same as the phase and amplitude of said second incoming AC power source;
    wherein upon closing of said first contact, said second contact, said third contact and said fourth contact by said means for closing, unconverted currents flowing through said first contact and said fourth contact are summed at a first summing terminal and unconverted currents flowing through said second contact and said third contact are summed at a second summing terminal.

2. The controller of claim 1 wherein said means for opening and closing comprises:
    a first relay coil circuit in communication with said first contact and said second contact;
    a second relay coil circuit in communication with said third contact and said fourth contact;
    means for supplying current to said first relay coil circuit and said second relay coil circuit upon satisfying one or more conditions; and
    means for powering said means for opening and closing.

3. The controller of claim 2 further comprising means for disrupting operation of said means for supplying current when a disturbance occurs.

4. The controller of claim 3 wherein said means for disrupting operation is a transistor circuit in communication with said means for powering and said means for supplying current.

5. The controller of claim 2 wherein said means for powering is an AC/DC converter circuit.

6. The controller of claim 2 wherein said means for powering is a transformer/regulator circuit.

7. The controller of claim 1 further comprising a third connector, said third connector in communication with said first summing terminal and said second summing terminal.

8. The controller of claim 2 wherein said means for supplying current comprises:
    a triac driving circuit in communication with said first relay coil circuit and said second relay coil circuit;

wherein said means for comparing comprises:
a first integrated circuit having a first input terminal and a first output terminal; said first integrated circuit in communication at its first output terminal with said triac driving circuit,
a second integrated circuit having a first input terminal, a second input terminal, a third input terminal, a fourth input terminal and a first output terminal, said second integrated circuit in communication at its first output terminal with said first integrated circuit at the first input terminal of said first integrated circuit;
a third integrated circuit having a first input terminal and a second input terminal and a first output terminal, the first input terminal of said third integrated circuit in communication with the second phase terminal of said first connector and the second input terminal of said third integrated circuit in communication with the first phase terminal of said first connector, the first output terminal of said third integrated circuit in communication with the first input terminal of said second integrated circuit;
a fourth integrated circuit having a first input terminal and a second input terminal and a first output terminal, the first input terminal of said fourth integrated circuit in communication with the first phase terminal of said first connector and the second input terminal of said fourth integrated circuit in communication with the first phase terminal of said second connector, the first output terminal of said fourth integrated circuit in communication with the second input terminal of said second integrated circuit;
a fifth integrated circuit having a first input terminal and a second input terminal and a first output terminal, the first input terminal of said fifth integrated circuit in communication with the first phase of terminal of said second connector and the second input terminal of said fifth integrated circuit in communication with the second phase terminal of said second connector, the first output terminal of said first integrated circuit in communication with the third input terminal of said second integrated circuit; and
a sixth integrated circuit having a first input terminal and a second input terminal and a first output terminal, the first input terminal of said sixth integrated circuit in communication with the second phase terminal of said second connector and the second input terminal of said sixth integrated circuit in communication with the second phase terminal of said first connector, the first output terminal of said sixth integrated circuit in communication with the fourth input terminal of said second integrated circuit.

9. The controller of claim 8 wherein said means for powering is in communication with said first integrated circuit, said second integrated circuit, said third integrated circuit, said fourth integrated circuit, said fifth integrated circuit and said sixth integrated circuit.

10. A controller for combining and summing two incoming single phase AC power sources located external to a connector, comprising:
a first connector having a first phase terminal and a second phase terminal, said first connector adapted for communication with a first externally located incoming single phase AC power source;
a second connector having a first phase terminal and a second phase terminal, said second connector adapted for communication with a second externally located incoming single phase AC power source, said second incoming AC power source independent of said first incoming AC power source;
a first contact having a terminal, said first contact terminal in communication with the second phase terminal of said first connector;
a second contact having a terminal, said second contact terminal in communication with the first phase terminal of said first connector;
a third contact having a terminal, said third contact terminal in communication with the first phase terminal of said second connector;
a fourth contact having a terminal, said fourth contact terminal in communication with the second phase terminal of said second connector;
means for comparing a phase and amplitude of said first externally located incoming AC power source with a phase and amplitude of said second externally located incoming AC power source without any conversion of said first externally located incoming AC power source or said second externally located incoming AC power source;
a first relay coil circuit in communication with said first contact and said second contact;
a second relay coil circuit in communication with said third contact and said fourth contact;
means for supplying current upon satisfying one or more conditions to said first relay coil circuit for closing said first contact and said second contact and to said second relay coil circuit for closing said third contact and said fourth contact; and
means for powering said means for supplying current;
wherein said one or more conditions is a determination by said means for comparing that a phase and amplitude of said first incoming single phase AC power source and a phase and amplitude of said second incoming single phase AC power source are the same;
wherein upon closing of said first contact, said second contact, said third contact and said fourth contact by said first relay coil circuit and said second relay coil circuit, unconverted currents flowing through said first contact and said fourth contact are summed at a first summing terminal and unconverted currents flowing through said second contact and said third contact are summed at a second summing terminal.

11. The controller of claim 10 further comprising a transistor circuit in communication with said means for powering and said means for supplying current, said transistor circuit disrupting operation of said means for supplying current when a disturbance occurs.

12. The controller of claim 10 wherein said means for powering is an AC/DC converter circuit.

13. The controller of claim 10 wherein said means for powering is a transformer/regulator circuit.

14. The controller of claim 10 further comprising a third connector, said third connector in communication with said first summing terminal and said second summing terminal.

15. The controller of claim 10 wherein said means for supplying current comprises:
a triac driving circuit in communication with said first relay coil circuit and said second relay coil circuit;
wherein said means for comparing comprises:
a first integrated circuit having a first input terminal and a first output terminal; said first integrated circuit in communication at its first output terminal with said Triac driving circuit,
a second integrated circuit having a first input terminal, a second input terminal, a third input terminal, a fourth input terminal and a first output terminal, said second integrated circuit in communication at its first output terminal with said first integrated circuit at the first input terminal of said first integrated circuit;

a third integrated circuit having a first input terminal and a second input terminal and a first output terminal, the first input terminal of said third integrated circuit in communication with the second phase terminal of said first connector and the second input terminal of said third integrated circuit in communication with the first phase terminal of said first connector, the first output terminal of said third integrated circuit in communication with the first input terminal of said second integrated circuit;

a fourth integrated circuit having a first input terminal and a second input terminal and a first output terminal, the first input terminal of said fourth integrated circuit in communication with the first phase terminal of said first connector and the second input terminal of said fourth integrated circuit in communication with the first phase terminal of said second connector, the first output terminal of said fourth integrated circuit in communication with the second input terminal of said second integrated circuit;

a fifth integrated circuit having a first input terminal and a second input terminal and a first output terminal, the first input terminal of said fifth integrated circuit in communication with the first phase terminal of said second connector and the second input terminal of said fifth integrated circuit in communication with the second phase terminal of said second connector, the first output terminal of said first integrated circuit in communication with the third input terminal of said second integrated circuit; and a sixth integrated circuit having a first input terminal and a second input terminal and a first output terminal, the first input terminal of said sixth integrated circuit in communication with the second phase terminal of said second connector and the second input terminal of said sixth integrated circuit in communication with the second phase terminal of said first connector, the first output terminal of said sixth integrated circuit in communication with the fourth input terminal of said second integrated circuit.

16. The controller of claim 15 wherein said means for powering is in communication with said first integrated circuit, said second integrated circuit, said third integrated circuit, said fourth integrated circuit, said fifth integrated circuit and said sixth integrated circuit.

17. The controller of claim 15 wherein if voltages present at the input terminals of said second integrated circuit have correct amplitude and phase, said second integrated circuit controls said first integrated circuit to activate said triac driving circuit.

18. A controller for combining and summing two incoming single phase AC power sources located external to a connector, comprising:

a first connector having a first phase terminal and a second phase terminal, said first connector adapted for communication with a first externally located incoming single phase AC power source;

a second connector having a first phase terminal and a second phase terminal, said second connector adapted for communication with a second externally located incoming single phase AC power source, said second incoming AC power source independent of said first incoming AC power source;

a first contact having a terminal, said first contact terminal in communication with the second phase terminal of said first connector;

a second contact having a terminal, said second contact terminal in communication with the first phase terminal of said first connector;

a third contact having a terminal, said third contact terminal in communication with the first phase terminal of said second connector;

a fourth contact having a terminal, said fourth contact terminal in communication with the second phase terminal of said second connector;

a first relay coil circuit in communication with said first contact and said second contact;

a second relay coil circuit in communication with said third contact and said fourth contact;

a triac driving circuit in communication with said first relay coil circuit and said second relay coil circuit;

a first integrated circuit having a first input terminal and a first output terminal; said first integrated circuit in communication at its first output terminal with said triac driving circuit;

a second integrated circuit having a first input terminal, a second input terminal, a third input terminal, a fourth input terminal and a first output terminal, said second integrated circuit in communication at its first output terminal with said first integrated circuit at the first input terminal of said first integrated circuit;

a third integrated circuit having a first input terminal and a second input terminal and a first output terminal; the first input terminal of said third integrated circuit in communication with the second phase terminal of said first connector and the second input terminal of said third integrated circuit in communication with the first phase terminal of said first connector, the first output terminal of said third integrated circuit in communication with the first input terminal of said second integrated circuit;

a fourth integrated circuit having a first input terminal and a second input terminal and a first output terminal, the first input terminal of said fourth integrated circuit in communication with the first phase terminal of said first connector and the second input terminal of said fourth integrated circuit in communication with the first phase terminal of said second connector, the first output terminal of said fourth integrated circuit in communication with the second input terminal of said second integrated circuit;

a fifth integrated circuit having a first input terminal and a second input terminal and a first output terminal; the first input terminal of said fifth integrated circuit in communication with the first phase terminal of said second connector and the second input terminal of said fifth integrated circuit in communication with the second phase terminal of said second connector, the first output terminal of said first integrated circuit in communication with the third input terminal of said second integrated circuit; and a sixth integrated circuit having a first input terminal and a second input terminal and a first output terminal; the first input terminal of said sixth integrated circuit in communication with the second phase terminal of said second connector and the second input terminal of said sixth integrated circuit in communication with the second phase terminal of said first connector, the first output terminal of said sixth integrated circuit in communication with the fourth input terminal of said second integrated circuit; and means for powering said first integrated circuit, said second integrated circuit, said third integrated circuit, said fourth integrated circuit, said fifth integrated circuit and said sixth integrated circuit;

wherein upon satisfying one or more conditions determined by said second integrated circuit from inputs received from said third, fourth, fifth and sixth integrated circuits, said first integrated circuit based on input received from said second integrated circuit, controls said triac driving circuit to supply current to said first relay coil circuit for closing said first contact and said second contact and to supply current to said second relay coil circuit for closing said third contact and said fourth contact; and means for supplying current upon satisfying one or more conditions to said first relay coil circuit for closing said first contact and said second contact and to said second relay coil circuit for closing said third contact and said fourth contact; and wherein said one or more conditions is a determination that a phase and amplitude of said first incoming single phase AC power source is the same as a phase and amplitude of said second incoming single phase AC power source;

wherein upon closing of said first contact, said second contact, said third contact and said fourth contact by said first relay coil circuit and said second relay coil circuit, unconverted currents flowing through said first contact and said fourth contact are summed at a first summing terminal and unconverted currents flowing through said second contact and said third contact are summed at a second summing terminal.

19. The controller of claim 18 further comprising a transistor circuit in communication with said means for powering said second integrated circuit, said transistor circuit disrupting operation of said second integrated circuit when a disturbance occurs.

20. The controller of claim 18 wherein said means for powering is an AC/DC converter circuit.

21. The controller of claim 18 wherein said means for powering is a transformer/regulator circuit.

22. The controller of claim 18 further comprising a third connector, said third connector in communication with said first summing terminal and said second summing terminal.

23. The controller of claim 18 wherein if voltages present at the input terminals of said second integrated circuit have correct amplitude and phase, said second integrated circuit controls said first integrated circuit to activate said triac driving circuit.

24. A controller for combining and summing two single phase AC power sources, comprising:

a first electrical connector adapted for communication with a first externally located incoming single phase AC power source;

a second electrical connector adapted for communication with a second externally located incoming single phase AC power source, said second incoming AC power source independent of said first incoming AC power source;

means for comparing a phase and amplitude of said first externally located incoming AC power source with a phase and amplitude of said second externally located incoming AC power source without any conversion of said first externally located incoming AC power source or said second externally located incoming AC power source;

means for opening and closing said first contact, said second contact, said third contact and said fourth contact based on information received from said means for comparing;

wherein when said means for comparing determines that the phase and amplitude of said unconverted first incoming AC power source is the same as the phase and amplitude of said unconverted second incoming AC power source said first incoming AC power source and said second incoming AC power source are summed together and available as one single phase AC power source.

* * * * *